Aug. 16, 1960 H. M. SICHEL 2,949,510

TELEPHONE HANGER

Filed Dec. 31, 1958

INVENTOR.
HAROLD M. SICHEL

BY Jerome Bauer

ATTORNEY

United States Patent Office 2,949,510
Patented Aug. 16, 1960

2,949,510

TELEPHONE HANGER

Harold M. Sichel, 38 Bulson Road, Rockville Centre, N.Y.

Filed Dec. 31, 1958, Ser. No. 784,320
8 Claims. (Cl. 179—146)

Figures 1, 2, 3, 4, 5, 6, 7:
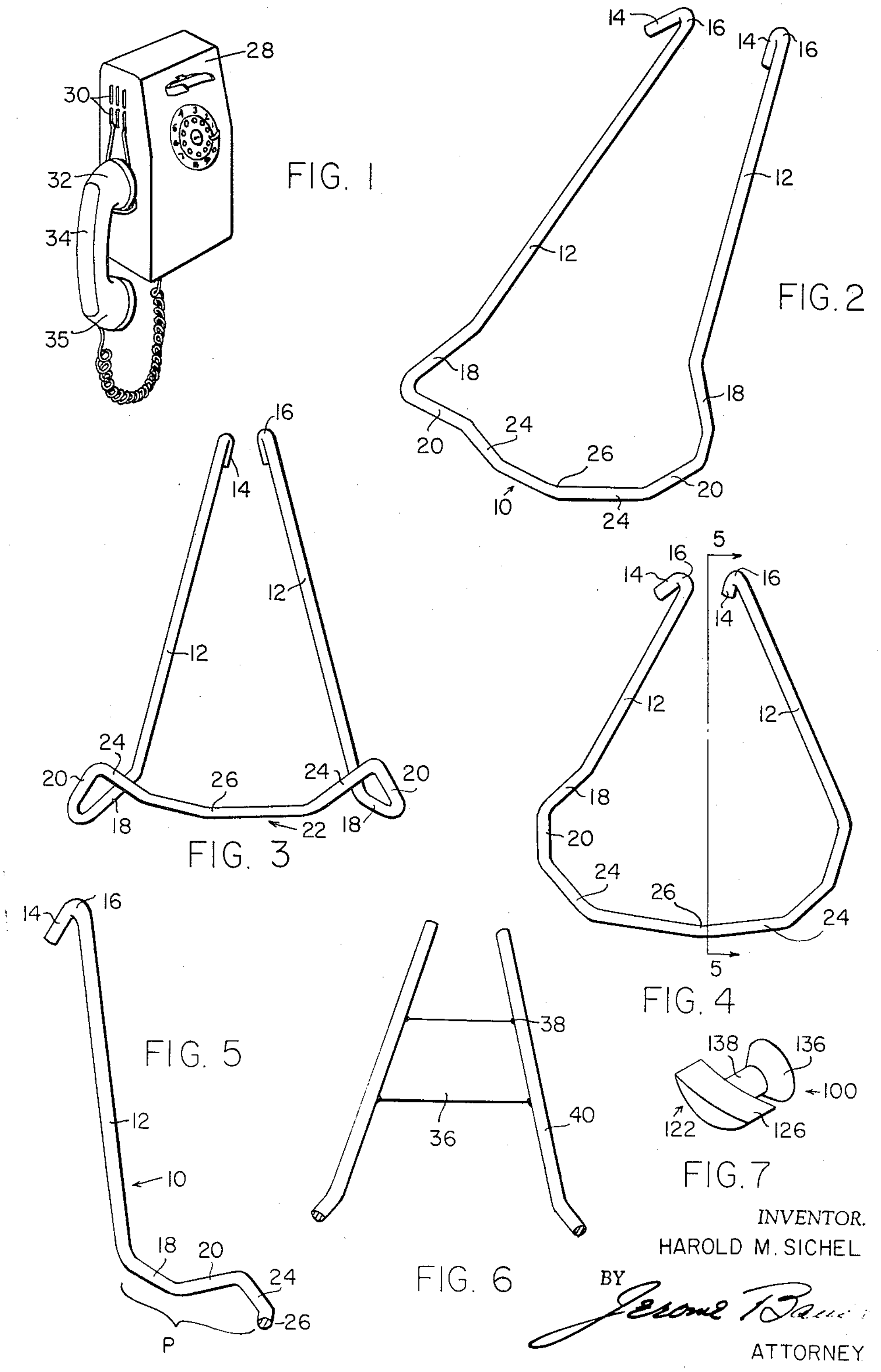

This invention relates to a metal support and particularly to a support adapted to be utilized in conjunction with a telephone receiver. The invention is especially suitable for use with wall type telephones.

There are generally two types of telephones in use today. The usual desk telephone is intended to rest on a desk or other flat surface while the wall type telephone is generally secured to and supported from the wall of a room or similar vertical retaining means. It is particularly for this type of telephone that the present invention is designed. Often, in business offices and in the home, the telephone is answered by a person other than for whom the call is intended. It then becomes necessary to let the telephone receiver dangle from the wall support while the intended person is summoned to reply. This is inconvenient and is sometimes injurious to the equipment or to the wall itself as the receiver may strike the floor or wall when released by the individual answering the phone. In order to overcome this problem, a resilient wire support or retaining cradle, adapted to be removably retained on the wall phone itself or an adjacent surface so that the telephone receiver may be supported thereon, has been devised.

The support member is preferably of a wire-like metal and is resilient so that its ends may be biased apart, if necessary, for attachment to the wall telephone. In addition, a self-centering cradle portion is provided so that the telephone ear-piece will always be seated vertically, even though the ear-piece is positioned hurriedly in the support.

It is the primary object of the invention to provide a support for the ear-piece of a telephone whereby said ear-piece will not be left in a dangling position when the speaker must for some reason leave the telephone before the call is completed.

Another object is to provide a support for an instrument that is resilient so that it may be adjusted when it is desired to attach same to said instrument.

Still another object is to provide a support that is inexpensive to manufacture, yet is resilient and durable in construction.

Yet another object is to provide a support that is readily attachable without marring or damaging the means to which it is attached.

A feature of the invention resides in providing hook-like fingers adapted to be hooked into a suitable opening, to mount the device.

Another feature of the invention resides in the provision of a magnetic or other fastening means on the support whereby it may be removably attached to a surface.

Yet another feature of the invention is to provide a self-centering section of the support whereby the element being supported will always depend in a vertical position in its seat.

With these and other objects in view, which will more fully appear as the nature of the invention is better understood, the same consists in the combination, arrangement and construction of parts hereinafter described in the appended claims and illustrated in the accompanying drawings, it being understood that many changes may be made in the construction of the several parts within the scope of the inventive concept without departing from the boundaries of the invention.

The invention is illustrated in the drawings wherein:

Fig. 1 illustrates one form of the support of the invention attached to a wall telephone and cradling the ear-piece, Fig. 2 is a perspective view of the support of the invention, Fig. 3 is a plan view of the invention, Fig. 4 is a top view of the invention, Fig. 5 is a section taken on line 5—5 of Fig. 4, and Fig. 6 is a plan view of another form of the invention, Fig. 7 is a plan view of still another form of the invention.

It is to be understood that while the invention is illustrated as being particularly useful with a wall-telephone, the general inventive concept of providing a support for a loose object is capable of taking other forms, and is able to retain other objects, such as tools, etc. thereon, all within the scope thereof.

Referring to Figures 1–5, the telephone receiver support member 10 is constructed of wire-like metal stock of sufficient diameter to be completely rigid in form. However, the wire inherently has a small amount of resiliency whereby its ends may be biased apart slightly when it is to be attached to the telephone housing.

As is evident from the drawings, the support member 10 comprises a pair of diverging arm members 12 of substantial length and each terminating at its end in a bent over and downwardly extending gripping finger 14. It should be noted that the gripping fingers 14 diverge slightly from the arms 12 to enable the support 10 to readily be inserted into the telephone slots 30 (see Fig. 1). This permits the bent-over portion 16, where the fingers 14 and arms 10 are joined, to carry the weight of the telephone receiver. Also, when it is desired to remove the device, a slight lifting motion will permit it to be lifted free of engagement with the telephone housing.

The opposite ends of the arms 12 continue as diverging extensions 18, bent in again laterally at 20. The cradle member generally identified by the numeral 22 joins the lateral extensions 20 in a unitary device and is provided with the sloping sides 24 and the transverse connecting seat member 26. As is best illustrated in Figs. 3 to 5, the extensions 18 not only diverge at an obtuse angle from the arms 12, but are in addition bent away from the plane of the arms 12. This is continued with respect to the lateral extensions 20, so that when the cradle member 22 is provided, a pocket, as depicted at "P" in Fig. 5, is formed to receive the ear-piece 32 of the telephone receiver 34 conforming to the shape thereof.

The method for using the invention is shown in Fig. 1. A wall telephone 28 of conventional construction is generally provided with a plurality of slots 30 on the side of the box. It is a simple matter to hook the end fingers 14 of the support 10 thereover and into the slots. It has been found generally desirable to slightly diverge the arms 12 apart when selecting a slot so that a firmer gripping action is obtained. The entire rear surface and length of the arms 12 abut the telephone box 28, while the divergent construction of the cradle member 22 is adapted to receive the ear piece 32 of the receiver 34. The sloping sides 24 guide the ear-piece 32 into seated position on member 26, so that it is not necessary to position the telephone precisely. In this manner the low center of gravity of the telephone receiver 34 causes it to hang perpendicular to the cradle when it has come to rest in its conforming seat. Thus it is ready to be picked up and taken off the cradle by the person for whom the telephone call has been intended.

There are times when it is not desirable or feasible to secure the support member 10 in the openings of the slot 30 of the telephone box as shown in Fig. 1. Accordingly it is within the scope of this invention to utilize other suitable securing means, as a magnetized bar 36, similar to that shown in Fig. 6. The bar 36 may be secured or connected at 38 to the divergent arms 40 by spot welding, or if the arms 40 are molded of a soft plastic material, a bar magnet 30 may be molded integral therewith. The remainder of the construction is similar to that described above. Thus, it should be noted that the form of invention as shown in Fig. 6 does not require the gripping fingers 14 and for this reason they do not appear in the drawing. When a magnetic means such as the bar magnet 36 is employed, the device shown in Fig. 6 may be applied against any metallic surface, whether it be the side of the telephone box 28, or any other suitable surface to which it will adhere.

Referring now to Fig. 7, it is noted that the device 100 there shown comprises a fastening means in the form of a suction cup member 136. The member 136 is formed integral with a cradle member 122 by a connecting or joining arm 138. The cradle member 132 is provided with a seating pocket 126, the surface of which conforms to a portion of the configuration of the telephone ear piece 32. It will be seen that the depth and width of the conforming pocket 126 is materially less than the conforming pocket of the cradle member 22 previously described. The reason being that the cradle member 22 is adapted to receive a substantial portion of the ear piece and to engage the same at its jointure with the handle section of the telephone receiver, while device 100 in Fig. 7 is adapted to cradle and provide a seat for only a portion of the underside of the threaded cover of the ear piece.

However, the manner of use and area of engagement provided by the pocket 126 does not affect the operation of the device 100. It must be recognized that when the ear piece 32 of the receiver 34 is seated on the cradle 122 the mouth piece 35 hangs down, well below the surface of the pocket 126. The mouth piece thus presents a center of gravity that is considerably lower than the surface of the pocket. Hence, when the ear piece 32 is seated on the pocket 126 in the manner shown in Fig. 7, the mouth piece 35 hangs in its normal position therebelow. The low center of gravity thereby retains the ear piece 32 in its pocket 126 and the receiver 34 remains in position perpendicular to the cradle.

Those skilled in the art will understand that fingers 14 or the magnetic bar 36 perform the same function as the suction member 136 in the device 100. For this reason these members may be employed interchangeably in any one of the devices shown in the figures of the drawings and previously described.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. A support for a telephone receiver or the like comprising a support member having a pair of diverging arm members, a cradle member joining the arm members into a unitary device and means on said support member adapted to be removably mounted on a telephone box, said means on said support member having gripping fingers extending from the free end of the arm members and bent over to combine with the support member for easy insertion into and removal from the telephone box and having magnetized bar, said magnetized bar being retained between the diverging arms of the support and adapted to be removably held on a metal surface.

2. A support for a telephone receiver or the like comprising a support member having a pair of diverging arm members, a cradle member joining said arm members into a unitary device, said cradle member including opposed sloping sides and a transverse seat connecting said sides, whereby a self-centering support for the telephone receiver is provided, and means on said support member adapted to be removably mounted on a telephone box.

3. A support for a telephone receiver or the like comprising a support member having a pair of diverging arm members, diverging extension means secured to one end of said arm members, lateral extension members bent inwardly from said diverging extension means, a cradle member joining said lateral extension members to form a telephone receiving seat, and means on said support member adapted to be removably mounted on a telephone box.

4. A support for a telephone receiver or the like comprising a support member having a pair of diverging arm members, diverging extension means secured to one end of said arm members, lateral extension members bent inwardly from said diverging extension means, a cradle member joining said lateral extension members to form a telephone receiving seat, and means on said support member adapted to be removably mounted on a telephone box, said cradle member including opposed sloping sides and a transverse seat connecting said sides, whereby a self-centering support for the telephone receiver is provided.

5. A support for a telephone receiver or the like comprising a support member having a pair of diverging arm members, diverging extension means secured to one end of said arm members, lateral extension members bent inwardly from said diverging extension means, a cradle member joining said lateral extension members to form a telephone receiving seat, and means on said support member adapted to be removably mounted on a telephone box, said diverging extension means being non-planar with respect to said diverging arm members whereby a pocket is provided to receive the telephone receiver ear-piece when it is seated in said cradle member.

6. A support for a telephone receiver or the like comprising a support member having a pair of diverging arm members, diverging extension means secured to one end of said arm members, said diverging extension means and said diverging arm members being in different planes, lateral extension members bent inwardly from said diverging extension means, a cradle member joining said lateral extension members to form together therewith a pocket adapted to receive a telephone receiver ear-piece, said cradle member including opposed sloping sides and a transverse seat connecting said sides, whereby a self-centering support for said telephone receiver is provided, and means on said support member adapted to be removably mounted on a telephone box.

7. The combination of claim 6, wherein said last named means comprises gripping fingers extending from the free end of the arm members and bent over to combine with the support member for easy insertion into and removal from the telephone box.

8. The combination of claim 6, wherein said last named means comprises a magnetized bar, said magnetized bar being retained between the diverging arms of the support and adapted to be removably held on a metal surface.

References Cited in the file of this patent

UNITED STATES PATENTS

| | | |
|---|---|---|
| 548,027 | Bernhard | Oct. 15, 1895 |
| 2,339,413 | King | Jan. 18, 1944 |
| 2,608,622 | Von Gunten | Aug. 26, 1952 |
| 2,658,116 | Skantze | Nov. 3, 1953 |
| 2,678,184 | Erdody | May 11, 1954 |

FOREIGN PATENTS

| | | |
|---|---|---|
| 517,007 | Italy | Feb. 25, 1955 |